United States Patent

Armellino

[15] 3,653,926

[45] Apr. 4, 1972

[54] METHOD OF PREPARING A POULTRY PRODUCT

[72] Inventor: Joseph H. Armellino, 25 Melville Road, Huntington Station, N.Y. 11746

[22] Filed: Dec. 22, 1970

[21] Appl. No.: 100,653

Related U.S. Application Data

[63] Continuation-in-part of Ser. No. 877,014, Nov. 14, 1969, abandoned, which is a continuation-in-part of Ser. No. 579,243, Sept. 14, 1966, abandoned.

[52] U.S. Cl. .............................................................99/174
[51] Int. Cl. ......................................................B65b 25/06
[58] Field of Search ..............99/107, 108, 109, 171, 171 H, 99/171 PP, 174, 176, 182, 187, 229, 194

[56] References Cited

UNITED STATES PATENTS

| | | | |
|---|---|---|---|
| 2,247,312 | 6/1941 | Rumsey | ....................................99/174 |
| 2,779,681 | 1/1957 | Sell et al. | ..................................99/174 |
| 2,922,186 | 1/1960 | Sartore | ...............................99/174 X |
| 3,095,308 | 6/1963 | Rumsey | ....................................99/174 |
| 3,193,392 | 7/1965 | Lundquist et al. | ........................99/174 |

*Primary Examiner*—Hyman Lord
*Attorney*—Lewis H. Eslinger, Alvin Sinderbrand and Curtis, Morris & Safford

[57] ABSTRACT

A method for preparing a poultry food product wherein the poultry pieces, without any additives, are placed within a pair of sleeves, one of which is substantially liquid impervious plastic material, selectively perforated, and the other sleeve is of open fabric-like material having substantial tensile strength, and pressure is thereafter applied which is sufficient of itself to amalgamate the poultry product by twisting one end of both sleeves containing the poultry pieces.

3 Claims, 9 Drawing Figures

Patented April 4, 1972
3,653,926
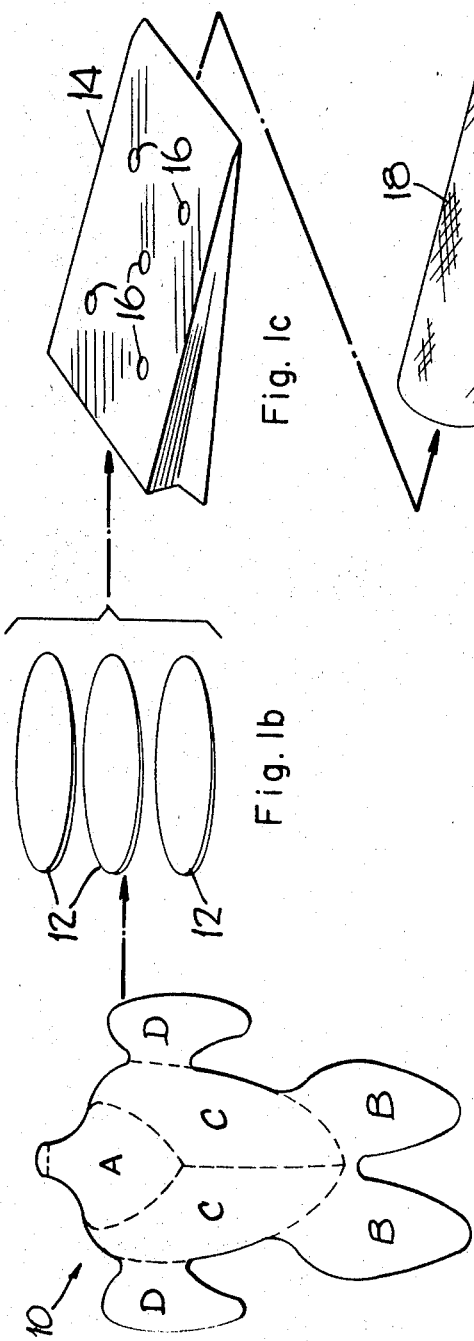
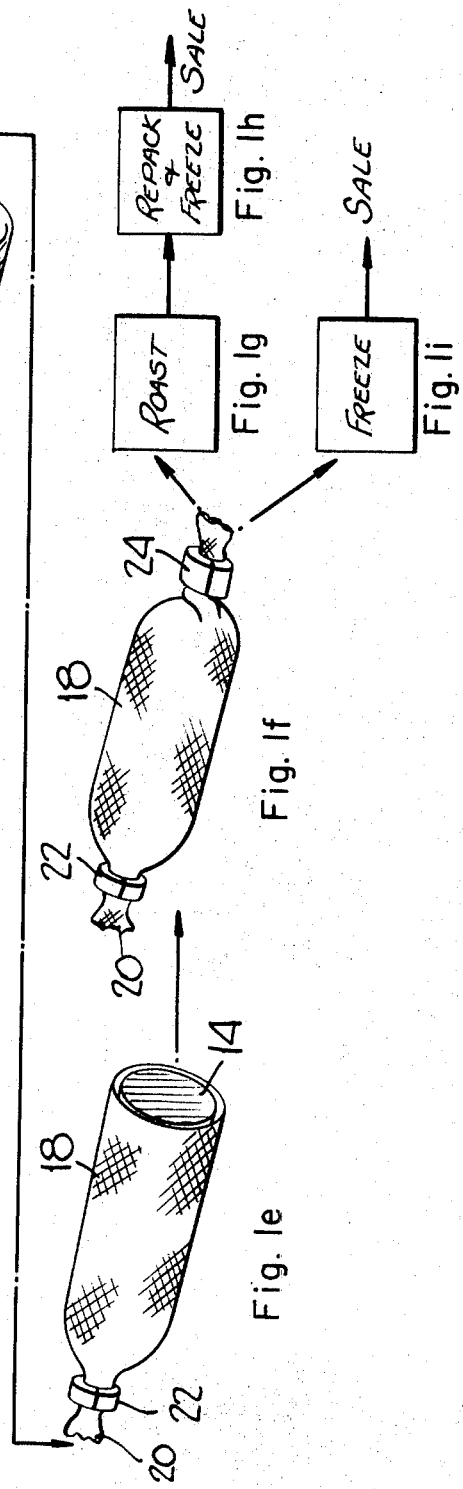
INVENTOR.
JOSEPH H. ARMELLINO
BY
Ward, Haselton, McElhannon, Oum, Brook & Litigated
ATTORNEYS

METHOD OF PREPARING A POULTRY PRODUCT

This is a continuation-in-part of my copending application Ser. No. 877,014, filed Nov. 14, 1969, now abandoned, which application is a continuation-in-part of application Ser. No. 579,243, filed Sept. 14, 1966, now abandoned, the disclosures of which are incorporated herein by reference.

This invention relates generally to the preparation of meat and poultry products in loaf form, and is particularly advantageous in connection with turkey processing operations.

The turkey industry has developed very considerably in the direction of providing preboned and packaged meat in the form of loaves or roasts. This manner of merchandising permits the consumer to obtain a desired amount of turkey in a small compact package. There is essentially no waste, and the warming or cooking may be done easily and with a minimum of effort.

Prior techniques for preparing turkey loaves have not, however, been able to preserve the desired freshness and texture which characterizes the meat of a whole freshly roasted turkey. Moreover, these techniques have required expensive molds and associated equipment which had to be cleaned and kept in good working order. Furthermore, some of these prior techniques have required the addition of substances other than the poultry product itself in order for a cohesive mass to be formed.

Typical prior art techniques involved the use of heavy stainless steel molds. The mold was first lined with skin and then pieces of meat and edible flavor or giblets would be distributed within the mold. A cover was placed over the meat and skin and this cover would be forced down until it exerted a pressure of between 1,000 and 2,000 pounds per square inch on the meat. The cover was then clamped in place to maintain this pressure and the entire assembly was placed in a freezer and brought to about 0° F. The frozen turkey was released from the mold, wrapped in a packaging material such as metallic foil and thereafter sold, cooked or canned.

The purpose for the application of very high molding pressures and for freezing under pressure was to cause the pieces of meat to cohere into a solid loaf which would maintain its integrity during cooking and slicing. This high pressure however, squeezed a large portion of the juices out of the meat so that the resulting product was dry and stringy. Moreover, the molds needed to operate under these high pressures were very expensive and had to be cleaned and sterilized after each operation.

Other typical prior art techniques involved the addition of an edible metallic salt to the poultry pieces in an attempt to form a creamy adhesive coating on the surfaces of each piece which acted as a cohesive substance so as to obtain cohesion of the poultry meat into a compact mass. This technique was dependent on the ability to extract salt soluble proteins from the pieces of poultry in order to provide the creamy adhesive coating for binding the pieces together. In order to form the required concentration of salt soluble protein on the surfaces of the pieces of poultry, the edible metallic salt was first applied to the pieces of poultry, which were then agitated or tumbled. After the requisite agitation the pieces were then pressed together in a container, and the resultant mass was then cooked so as to enhance the adhesive effect of the coating and thereby bind the pieces of poultry together in a compact mass.

The present invention overcomes all of the above difficulties of the prior art. According to the present invention there is provided a turkey loaf which is integral and cohesive and which retains all of the qualities of texture, moistness and flavor of freshly roasted whole turkey. The present invention moreover eliminates the need for costly molds and similar equipment; eliminates the need for mold cleaning and sanitizing; and eliminates the need for the addition of any substance other than the poultry pieces in order to form a compact mass, and the requisite agitation associated with the use of edible salts as an additive.

In its more general aspects, the present invention involves the placing of pieces of turkey meat, and no other substance, into a first sleeve of a flexible material such as liquid impervious plastic which is capable of retaining the natural juices of the meat, but which is selectively perforated to allow escape of air, along with a small portion of the natural juices, thereafter placing the plastic sleeve into a second sleeve of open flexible material such as cheese-cloth which provides tensile strength, twisting the sleeves at their ends to produce a pressure within the sleeves which is sufficient of itself to squeeze and compact the turkey meat into a cohesive poultry product, and clamping the twisted ends to maintain the structure. The thus formed loaves may then be cooked and frozen or vice versa.

The double sleeve arrangement provides a disposable mold which serves to obtain a substantially cylindrical outer configuration for the loaf and which at the same time keeps substantially all of the natural juices in their original location within the meat itself. The sleeves are kept in place until after the meat has been cooked and cooled, so that the resulting loaf will hold together for slicing without the need for special high pressure devices which extract the natural juices from the meat.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the specification, wherein:

FIGS. 1(a) to 1(i) are a series of illustrations depicting the various steps in preparing a turkey loaf according to the present invention.

In FIG. 1(a) there is shown a turkey 10 which has been plucked, cleaned and eviscerated. The different cuts of light and dark meat (shown in dotted outline as areas A–D) are stripped from the bones of the turkey and selectively combined according to the desired composition of the final loaf. For example, the loaf may consist of all light meat, all dark meat or a selected proportion of each. Since each turkey is not cut in exactly the same manner, due to the varying sizes thereof and the skill of the cutter, the boneless pieces of meat have a generally random configuration.

The selected cuts of meat are shown by way of example at 12 in FIG. 1(b). These cuts are assembled as by sandwiching and/or rolling; and are then placed in a first wrapping such as a plastic bag 14 as shown in FIG. 1(c). No other substance than these cuts of meat is placed in the wrapping, and thus there is no need for the agitation required when edible salts were used as an additive.

The bag 14 is formed of a plastic material, of flexible character, which is essentially moisture-proof at least to the extent that the natural meat juices will not flow therethrough. However, bag 14 is selectively, perforated as at 16, in order to enable any entrapped air to escape therefrom. In a presently preferred arrangement, four such perforations each about one-eighth to one-fourth inch in diameter are provided on both sides of the bag. It is noted that some of the natural meat juices will escape from bag 14 through these perforations. However, since there are only four small perforations, only those juices in the area thereof will escape and substantially all of the juices in the meat will be retained within the bag. The meat itself also provides a natural barrier for the escape of juices through the holes from areas in the meat remote therefrom.

The bag 14, containing the pieces of turkey meat 12, is thereafter placed inside a second or outer wrapping such as cheese-cloth sleeve 18, as shown in FIG. 1(d). This outer wrapping also is flexible but it provides tensile strength for holding the turkey meat together. Actually, the outer wrapping 18 serves as a disposable mold as will be shown more fully hereinbelow.

One end 20 of the cheese-cloth sleeve 18 is then clamped by means of a first metal clip 22 as shown in FIG. 1(e). The end 20 corresponds to the closed end of the plastic bag 14 so that there is effect produced a double walled bag containing the turkey meat. The open ends of the bag 14 and the outer wrapping 18 are then closed, twisted and clamped with a second metal clip 24 as shown in FIG. 1(f) so as to squeeze the turkey meat into a substantially solid compact mass and to expel air out from within the plastic bag. The twisting is preferably done by hand; and the squeezing pressures are kept below that which would result in forcing the natural juices out of the meat and through apertures 16.

As a result of the twisting action the cheese-cloth sleeve is subjected to uniform tension both in a longitudinal and a circumferential direction which reduces the effective length of the sleeves between the ends thereof and thereby produces a pressure which is sufficient of itself to amalgamate the pieces into a cohesive poultry product. This tension causes the assembly to assume a generally cylindrical shape and the cheese-cloth and plastic thereupon cooperate to assume the function of a mold. This mold, however, is very low in cost; and fact, it is actually disposable. The mold moreover is of such characteristics that it is capable of holding the meat together and in a generally cylindrical shape during cooking, and requires no additives for the poultry meat in order to hold the meat together. Further, substantially all of the meat juices are retained during such cooking since only the juices adjacent the small apertures 16 can escape. In the case of prior high pressure steel molds, the meat and mold had to be frozen until the meat solidified. Only then could the meat be removed for cooking. The present invention obviates this situation.

After twisting and clamping the inner and outer sleeves, the assembly may then be processed in either of two ways. In the first way as indicated in FIG. 1(G), the assembly is oven roasted, preferably at a temperature of 225° to 250° F., until the internal meat temperature reaches a temperature of 145° to 160° F. These times and temperatures result in a minimum of shrinkage and drying and a minimum in loss of natural meat juices through apertures 16 so that the resulting product retains its flavor and moisture. Moreover, there is a minimum of pressure build up in the assembly during cooking since air and vapor in the meat escape through apertures 16. In any event the materials of which sleeves 14 and 18 are formed have sufficient tensile strength to withstand any foreseeable pressure increase in the assembly.

Following this roasting operation, the inner and outer sleeves 14 and 18 are then removed for repacking of the meat as indicated in FIG. 1(h). This repacking is accomplished preferably by placing the still whole roll into a heat shrinkable plastic bag, shrinking the bag by dipping it into hot water, subjecting the interior of the bag to a vacuum and then sealing it. This vacuum repackaging with a heat shrinkable plastic bag serves to accommodate any shrinking which may have occurred in the roasting operation, so that the meat is retained in a tightly held compact loaf. The thus packaged meat may then be cooled and sold immediately or it may be frozen for later sale. The cooling and/or freezing of the roasted, repackaged tightly held loaf, serves to induce cohesion thereof so that at the time of consumption the loaf may be sliced in the manner of a conventional roast.

The second way of processing, as indicated in FIG. 1(i) merely involves directly freezing the meat in the inner and outer sleeves 14 and 18. The thus frozen uncooked loaf is then stored for later sale in that condition to the consumer. The consumer thereafter may oven roast the loaf to his own taste, such roasting, of course, taking place with the meat still retained within the sleeves 14 and 18. As in the case of the factory roasting operation described above, there inevitably occurs a certain amount of shrinkage in home roasting. However, because of the nature of the adjustable disposable mold made up of the sleeves 14 and 18, the consumer, after roasting, simply retwists one end of the sleeve. This twisting tightens the sleeves about the meat to accommodate the shrinkage and thereby insures that the meat will be tightly held in a compact loaf during subsequent cooling. As in the first described processing technique, this type packaging during cooling serves to cause the meat to cohere into an integral loaf so that at the time of consumption, it may be sliced without the separate pieces of meat coming apart.

It will be appreciated that according to the present invention there is achieved a solid turkey loaf which is of higher moisture content and truer texture than has heretofore been possible. Moreover, there is provided a low cost disposable turkey loaf mold which is more suitable for cooking and freezing turkey meat than anything seen in the prior art.

Although an illustrative embodiment of this invention has been described in detail herein with reference to the accompanying drawings, it is to be understood that the invention is not limited to that precise embodiment, and that various changes and modifications may be made therein by one skilled in the art without departing from the scope or spirit of the invention.

What is claimed is:

1. A method of preparing a poultry product, said method comprising the steps of placing no other substance than cut, randomly configured pieces of boneless poultry inside a first sleeve which is closed at one end and formed of flexible, substantially liquid impervious plastic material capable of retaining substantially all of the natural juices from said pieces of poultry and which has only sufficient perforations to permit expulsion of air therefrom; placing said first sleeve inside an outer sleeve of open fabric material having substantial tensile strength; closing said outer sleeve at one end thereof which is adjacent the closed end of the first sleeve and securing said one end of the outer sleeve in the closed relationship; closing the other ends of said sleeves containing said pieces of poultry and twisting together said other closed ends to reduce the effective length of said sleeves between the ends thereof and thereby produce a pressure within said sleeves which is sufficient, of itself, to amalgamate said pieces into a cohesive poultry product having a substantially uniform configuration without forcing the natural juices and other liquids from the pieces of poultry; and securing said twisted ends in the twisted position to maintain said poultry product in a cohesive compacted form.

2. A method as in claim 1 wherein said poultry product is turkey.

3. A method as in claim 1 including the steps of cooking, repacking said cooked poultry product in a heat shrinkable plastic bag, heat shrinking the bag about said product and thereafter cooling said product.

* * * * *